United States Patent [19]

Kanter

[11] Patent Number: 4,646,095

[45] Date of Patent: Feb. 24, 1987

[54] METHOD OF RESOLVING CLOSELY SPACED TARGETS

[75] Inventor: Irving Kanter, Lexington, Mass.

[73] Assignee: Raytheon Company, Lexington, Mass.

[21] Appl. No.: 766,171

[22] Filed: Aug. 16, 1985

[51] Int. Cl.[4] .............................................. G01S 13/44
[52] U.S. Cl. .................................... 342/149; 342/194
[58] Field of Search .......................... 343/5 NQ, 16 M

[56] References Cited

U.S. PATENT DOCUMENTS

| | | | |
|---|---|---|---|
| 3,130,402 | 4/1964 | Kuck | 343/16 M X |
| 4,084,160 | 4/1978 | Leuenberger et al. | 343/16 M |
| 4,136,343 | 1/1979 | Heffner et al. | 343/16 M X |
| 4,219,816 | 8/1980 | Schenkel et al. | 343/16 M |
| 4,532,515 | 7/1985 | Cantrell et al. | 343/5 NQ X |

Primary Examiner—T. H. Tubbesing

Attorney, Agent, or Firm—Philip J. McFarland

[57] ABSTRACT

A method of processing signals received by a four quadrant monopulse antenna to resolve the signals from two sources within the sum beam of such antenna is shown to comprise the steps of: (a) separately quadrature detecting each one of the signals (A, B, C and D) received at each one of the four quadrants to form corresponding complex signals having real (I) and imaginary (Q) terms, each one of such complex video signals being representative of a different one of the signals A, B, C and D; (b) forming the monopulse sum (A+B+C+D) signal, and monopulse difference signals [(A+B)−(C+D)], [(A+C)−(B+D)] and [(A+D)−(B+C)] and the corresponding monopulse ratios; and (c), calculating the monopulse ratios of the two signals that, when extant simultaneously, produce the corresponding monopulse ratios.

2 Claims, 3 Drawing Figures

METHOD OF RESOLVING CLOSELY SPACED TARGETS

BACKGROUND OF THE INVENTION

This invention pertains generally to tracking radars, and more particularly to phase-comparison monopulse radars.

It has been recognized for many years that the presence of two targets, or signal sources, within the sum beam of a phase-comparison monopulse radar may reduce the accuracy of tracking by such a radar. Degradation is suffered because signals from the two targets, or signal sources, may combine to form a simple composite signal that, when processed, produces monopulse sum and difference signals corresponding to a point in space different from either of the points occupied by the two targets, or signal sources.

The actual tracking point of a monopulse radar illuminating two closely spaced targets, or signal sources, depends upon the relative amplitudes of the signals received from the two targets, or signal sources. Therefore, if the two targets have complex shapes (as aircraft), or if two signal sources are Gaussian jammers, the parameters of the single composite signal will change with time in a random manner. As a result, then, the tracking point will also vary randomly.

To reduce the deleterious effects of two targets, or signals sources, in the sum beam of a monopulse radar, conventional measures may be taken. For example, the sum beam may be made as narrow as possible and the bandwidth of the receiver may be made as narrow as possible. However, even after such measures are taken, there remain many important situations in which significant tracking errors occur because of the presence of two targets, or signal sources, in the sum beam of a monopulse radar.

There have been some attempts made to process monopulse signals to determine the presence of two targets, or signal sources, in the sum beam and then to correct for the accompanying boresight angle error. For example, Heffner et al (U.S. Pat. No. 4,136,343) teach that the existence of high level (relative to the amplitude of the signal in the sum channel) signals in the elevation and azimuth difference channels is indicative of two targets, or signal sources, in the sum beam of a monopulse tracking radar used as the sensor in a guidance system for a guided missile. By appropriately processing the monopulse sum and difference signals, a guidance command signal may be derived to force the boresight line of the monopulse antenna toward one of the targets, or signal sources. Ultimately, then, only the selected target, or signal source, will remain in the sum beam to provide the requisite tracking signals. Although a simple and reliable way in which to determine whether or not two targets are present in the sum beam of a monopulse radar is taught in the cited patent to Hefner et al, there is not suggestion that the boresight error of each one of two targets should, or may, be measured. Therefore, the system disclosed by Heffner et al would be useful only in tactical situations in which selection of the particular one of the targets, or signal sources, on which a missile is to home is of no concern. Further, it will be noted that, until there is a single target in the sum beam, the measurements required by the system disclosed by Hefner et al must be made continuously.

Leuenberger et al (U.S. Pat. No. 4,084,160) and Schenkel et al (U.S. Pat. No. 4,219,816) teach that angle error components caused by two targets in the sum beam of a monopulse radar may be determined by processing, in addition to the conventional monopulse signals, a so-called "cross-term" signal. With the angle error components determined, an iterative procedure may then be followed to obtain an estimate of the boresight error angle of each of the two targets. Even though the method of either of the just-cited patents may be useful in some tactical situations (specifically in the situation when the radar is being used as a search radar and there is sufficient time to carry out the required iterative procedure) there are situations in which sufficient time is not available to follow the disclosed method in either of the references being discussed. For example, when a radar-guided missile is closing on two closely spaced targets, an iterative procedure to resolve the signals from the two may not be practical.

SUMMARY OF THE INVENTION

With this background of the invention in mind, it is therefore a primary object of this invention to provide a signal processing technique for uniquely resolving the individual pitch and yaw locations of two points targets (or a pair of noise jammers) within the sum beam of a monopulse radar antenna.

It is another object of this invention to resolve each of the pair of targets using only one measurement and without the need for an iterative signal processing technique.

It is yet another object of this invention to provide a signal processing technique for resolving each of a pair of targets within the sum beam of a monopulse radar, such technique being independent of the amplitude and phase of the signal from each target.

The foregoing and other objects of this invention are generally attained by providing a monopulse radar with an antenna having four phase centers symmetrically disposed about the boresight line of the antenna and a four channel receiver for processing the signals from each of the phase centers separately and then passing the resulting signals to a digital computer wherein the pitch and yaw locations of each one of the targets is determined.

BRIEF DESCRIPTION OF THE DRAWINGS

Other objects and many of the attendant advantages of this invention will be readily appreciated as the same become better understood by reference to the following detailed description when considered in connection with the accompanying drawings, wherein.

DESCRIPTION OF THE PREFERRED EMBODIMENT

Figure 1:
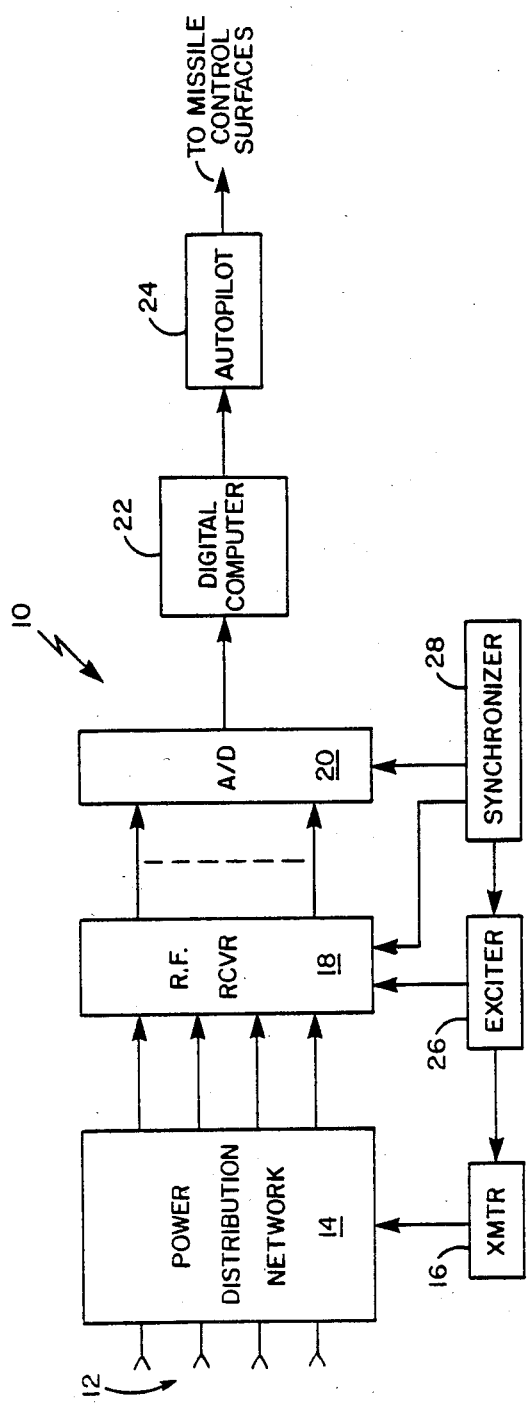
FIG. 1 is a simplified block diagram of a monopulse radar adapted to perform signal processing in accordance with this invention.

Referring now to FIG. 1, a monopulse radar 10 in a guided missile (not shown) adapted to perform the herein-contemplated signal processing technique is shown to include a four quadrant antenna 12 which will be described in detail hereinbelow with reference to FIG. 2. Suffice it to say here that the four quadrant antenna 12 is connected to a power distribution network 14 in any convenient manner as by means of coaxial cables (not shown). It will now be appreciated by those of skill in the art that the power distribution network 14 may be conventional, comprising a four-way power divider wherein the signal from the transmitter 16 may be split into four separate channels and fed to each of the four quadrants to form a sum beam on "transmit" and four circulators to "transmit/receive" switches to pass received signals to an R.F. receiver 18 on "receive."

The R.F. receiver 18 here is a four channel receiver with each channel operating in a conventional manner to convert the signal received at each phase center of the four quadrant antenna 12 to corresponding in-phase (I) and quadrature phase (Q) video signals. The I and Q output signals from each channel of the R.F. receiver 18 are digitized in an analog-to-digital (A/D) converter 20 and passed to a digital computer 22. Such computer may, for example, be similar to the one shown in U.S. Pat. No. 4,037,202, inventor John Terzian, issued July 19, 1977 and assigned to the same assignee as the present application. The digital computer 22 is effective to combine the I and Q data from each of the four channels and process such data, in a manner to be described in detail hereinbelow, to resolve and derive guidance signals to each of the pair of targets (not shown). Such guidance signals are passed to a conventional autopilot 24 to develop control signals applied to the missile control surfaces (not shown) to effect an intercept of one of the targets. Completing the monopulse radar 10 are an exciter 26 and a synchronizer 28. The exciter 26 generates the transmitted waveforms that are amplified in the transmitter 16, as well as the requisite local oscillator signals for the R.F. receiver 18. The synchronizer 28, which is controlled by the digital computer 22, provides the timing function (i.e., setting the pulse repetition interval, setting of the range gates within the R.F. receiver 18, and the timing of the strobe pulses for the A/D converter 20) for the monopulse radar 10.

Figure 2:
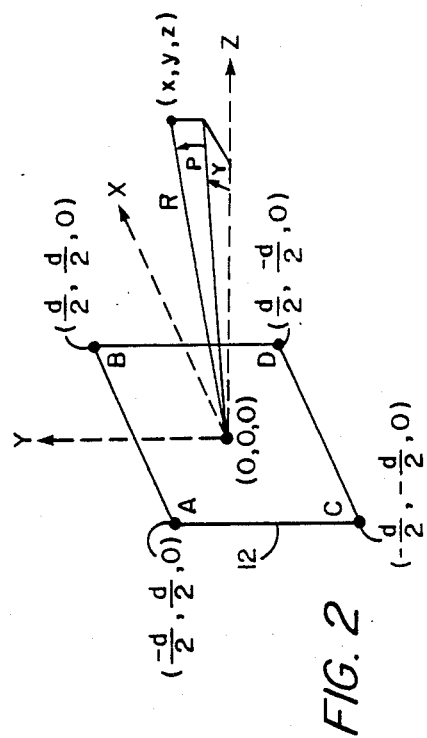
FIG. 2 is a sketch of the antenna of FIG. 1 useful in understanding the contemplated signal processing technique.

Referring now to FIG. 2, the four quadrant antenna 12 is shown to include four phase centers labelled, respectively, A, B, C and D. The four phase centers are shown to form a square of the side d in the XY plane. In the X, Y, Z orthogonal triad reference system the pitch and yaw angles of a far field target at the point (x, y, z) are given equations (1) and (2), respectively, where R is the target range.

$$\sin P = y/R \quad (1)$$

$$\cos P \sin Y = x/R \quad (2)$$

Assuming, for ease of explanation, that a target (not shown) emits a monochromatic spherical wave and defining $$A/4 = (K/R)e^{j2\pi f(t - R/c)} \quad (3)$$

the signals received at phase centers A, B, C and D may be written as:

$$V_A = (A/4)e^{(-\frac{j\pi d}{\lambda})(\frac{x-y}{R})} \quad (4)$$

$$V_B = (A/4)e^{(\frac{j\pi d}{\lambda})(\frac{x+y}{R})} \quad (5)$$

$$V_C = (A/4)e^{(-\frac{j\pi d}{\lambda})(\frac{x+y}{R})} \quad (6)$$

$$V_D = (A/4)e^{(\frac{j\pi d}{\lambda})(\frac{x-y}{R})} \quad (7)$$

The RF hybrids in a conventional monopulse arithmetic network (not shown) form the following output signals that are passed from the monopulse antenna 12 through the R.F. receiver 18 (FIG. 1) and the A/D converter 20 to the digital computer 22 (FIG. 1):

$$S = V_A + V_B + V_C + V_D = A \cos\frac{\pi d}{\lambda} \frac{x}{R} \cos\frac{\pi d}{\lambda} \frac{y}{R} \quad (8)$$

$$D_y = -i[(V_B + V_D) - (V_A + V_C)] = \quad (9)$$

$$A \sin\frac{\pi d}{\lambda} \frac{x}{R} \cos\frac{\pi d}{\lambda} \frac{y}{R}$$

$$D_p = -i[(V_A + V_B) = (V_C + V_D)] = \quad (10)$$

$$A \cos\frac{\pi d}{\lambda} \frac{x}{R} \sin\frac{\pi d}{\lambda} \frac{y}{R}$$

$$\Delta = [(V_A + V_D) - (V_B + V_C)] = \quad (11)$$

$$A \sin\frac{\pi d}{\lambda} \frac{x}{R} \sin\frac{\pi d}{\lambda} \frac{y}{R}$$

When two targets are present within the beamwidth of the antenna 12, Equations (8) through (11) become:

$$S = S_1 + S_2 \quad (12)$$

$$D_y = \lambda_1 S_1 + \lambda_2 S_2 \quad (13)$$

$$D_p = a_1 S_1 + a_2 S_2 \quad (14)$$

$$\Delta = \lambda_1 a_1 S_1 + \lambda_2 a_2 S_2 \quad (15)$$

where for k=1, 2

$$S_k = A_k \cos\frac{\pi d}{\lambda} \frac{x_k}{R} \cos\frac{\pi d}{\lambda} \frac{y_k}{R} \quad (16)$$

$$r_k = \tan\left(\frac{\pi d}{\lambda} \cos P_k \sin Y_k\right) \quad (17)$$

$$a_k = \tan\left(\frac{\pi d}{\lambda} \sin P_k\right) \quad (18)$$

The complex Equations (12) through (15) are a set of eight real equations for the eight unknowns $r_1$, $a_1$, $r_2$, $a_2$, and the two complex quantities $S_1$ and $S_2$.

Defining $$Re^{i\phi} = S_2/S_1 \quad (19)$$

Equations (12) through (15) may be reduced to:

$$D_y/S = \frac{\lambda_1 + \lambda_2 Re^{i\phi}}{1 + Re^{i\phi}} = b_1 + ic_1 \quad (20)$$

$$D_p/S = \frac{a_1 + a_2 Re^{i\phi}}{1 + Re^{i\phi}} = b_2 + ic_2 \quad (21)$$

$$\Delta/S = \frac{\lambda_1 a_1 + \lambda_2 a_2 R e^{i\phi}}{1 + R e^{i\phi}} = b_3 + ic_3 \quad (22)$$

It should now be appreciated that if $c_1=c_2=0$ (i.e., the monopulse ratios are real) the presence of a single target is indicated and its yaw and pitch positions may be determined from Equations (20) and (21), respectively, be setting $R=0$. If, on the other hand, there are two targets present within the beamwidth of the four quadrant antenna 12, then either $c_1$ or $c_2$ would not equal zero. If we assume that $c_1$ is not equal to zero, then $r_1$ is not equal to $r_2$ and equation (20) may be utilized to solve for $Re^{i\phi}$ which yields:

$$R e^{i\phi} = \frac{(b_1 + ic_1) - \lambda_1}{\lambda_2 - (b_1 + ic_1)} \quad (23)$$

Substituting Equation (23) into Equations (21) and (22) yields the following two complex equations for $r_1$, $r_2$, $a_1$ and $a_2$:

$$a_1(\lambda_1 - b_1 - ic_1) + a_2(b_1 + ic_1 - \lambda_1) = (\lambda_2 - \lambda_1)(b_2 + ic_2) \quad (24)$$

$$\lambda_1 a_1(\lambda_2 - b_1 - ic_1) + \lambda_2 a_2(b_1 + ic_1 - \lambda_1) = (\lambda_2 - \lambda_1)(b_3 + ic_3) \quad (25)$$

The imaginary terms in Equations (24) and (25) yield the following two equations:

$$a_2 + a_1 = (\lambda_2 - \lambda_1)c_2/c_1 \quad (26)$$

$$\lambda_2 a_2 - \lambda_1 a_1 = (\lambda_2 - \lambda_1)c_3/c_1 \quad (27)$$

which are linear in $a_1$, $a_2$ and in $r_1$, $r_2$. Solving for $a_1$, $a_2$ yields:

$$a_1 = (c_3 - \lambda_2 c_2)/c_1 \quad (28)$$

$$a_2 = (c_3 - \lambda_1 c_2)/c_1 \quad (29)$$

Finally, eliminating $a_1$, $a_2$ from the real parts of Equations (24) and (25) leads, via Equations (20) through (22), to the following:

$$r_1 + r_2 = \frac{c_3 + c_2 b_1 - c_1 b_2}{c_2} = \frac{I\left(\frac{\Delta}{S}\right) + I\left(\frac{D_p}{S} \frac{D_y^*}{S^*}\right)}{I\left(\frac{D_p}{S}\right)} \quad (30)$$

$$= \frac{I(\Delta S^*) + I(D_p D_y^*)}{I(D_p S^*)}$$

$$r_1 r_2 = \frac{I\left(\frac{\Delta}{S} \frac{D_y^*}{S^*}\right)}{I\left(\frac{D_p}{S}\right)} = \frac{I(\Delta D_y^*)}{I(D_p S^*)} \quad (31)$$

where the asterisk is used to designate the complex conjugate. Employing the identity $$\left.\begin{array}{c} r_1 \\ r_2 \end{array}\right\} = \tfrac{1}{2}[(r_1 + r_2) \pm ((r_1 + r_2)^2 - 4 r_1 r_2)^{\frac{1}{2}}] \quad (32)$$

the plus sign will yield the larger of $r_1$, $r_2$, which is automatically designated as $r_1$, and the minus sign will then yield $r_2$. Equations (28) and (29) will then unambiguously yield the associated $a_1$, $a_2$.

Figure 3:
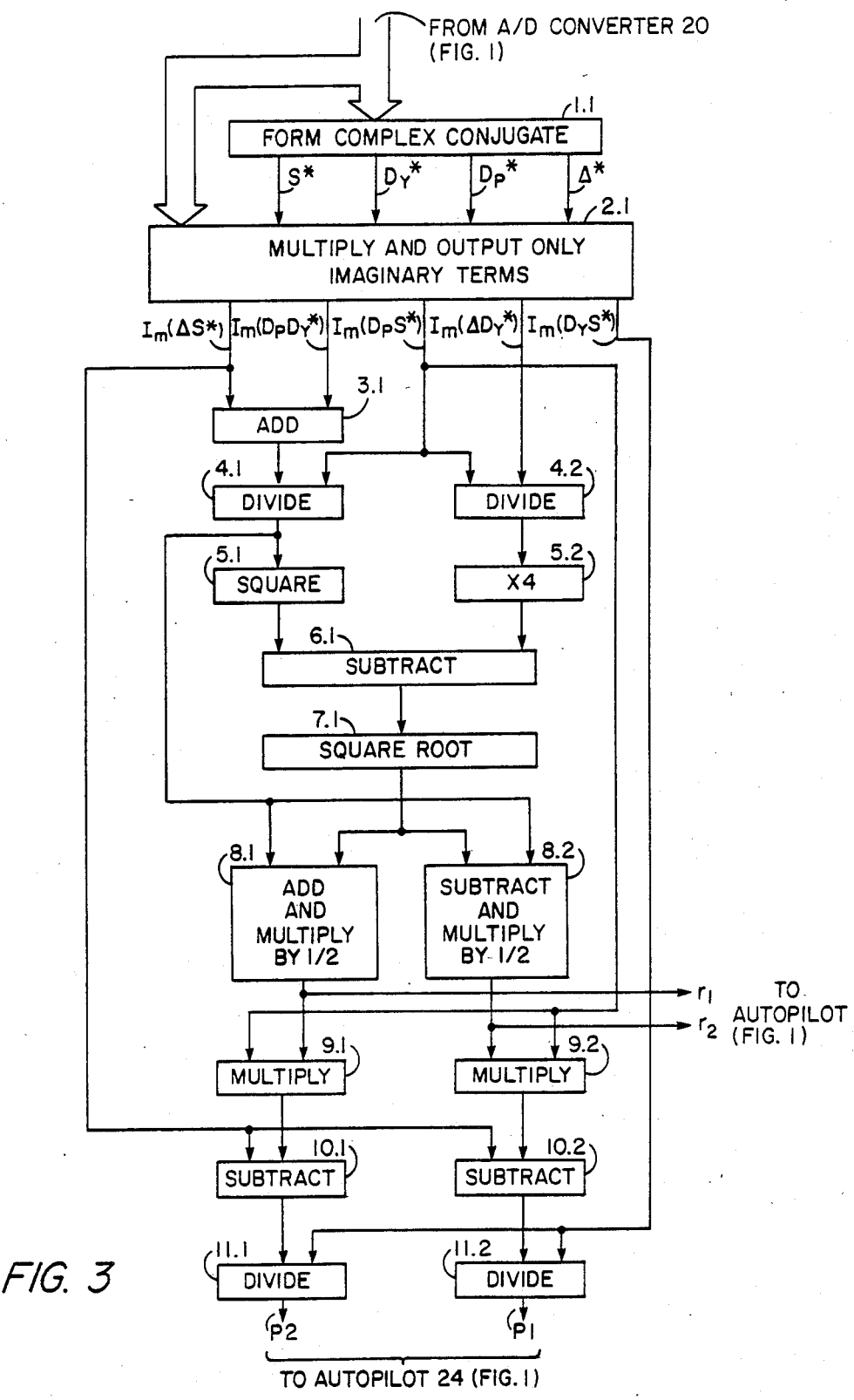
FIG. 3 is a flow chart, somewhat simplified, showing how signals received by the antenna of FIG. 2 may be processed to uniquely resolve each of the pair of targets.

Referring now to FIG. 3, the flow chart shown therein is deemed to be more instructive to one of skill in the art than a detailed program in any language. Thus, in step 1.1 the complex conjugate of the input data from the A/D converter 20 (FIG. 1) are formed. In step 2.1 those complex conjugates are multiplied with the original input data but only the following imaginary terms of the resulting products, corresponding, respectively, to equations (19) through (23) are provided as outputs: $I_m (D_y S^*)$, $I_m (D_p S^*)$, $I_m (\Delta S^*)$, $I_m (D_p D_y^*)$, and $I_m (\Delta D_y^*)$. In step 3.1 the terms $I_m (\Delta S^*)$ and $I_m (D_p D_y^*)$ are combined to form the numerator of the right hand side of Equation (30). In step 4.1 that numerator is divided by the term $I_m (D_p S^*)$ to obtain a value for $r_1 + r_2$ in accordance with Equation (30). In step 4.2. the term $I_m (\Delta D_y^*)$ is divided by the term $I_m (D_p S^*)$ to obtain a value for $r_1 r_2$ in accordance with Equation (31). In steps 5.1 through 7.1, the square root term of Equation (32) is evaluated. Thus, in step 5.1 the $r_1 + r_2$ term from step 4.1 is squared and in step 5.2 the $r_1 r_2$ term from step 4.2 is multiplied by 4. In step 6.1 the $4(r_1 r_2)$ term from step 5.2 is substracted from the $(r_1 + r_2)^2$ term formed in step 5.1, and in step 7.1 the square root of the remainder is formed. In step 8.1 the square root of the remainder is added to the $r_1 + r_2$ term formed in step 4.1 and the sum is then multiplied by $\tfrac{1}{2}$ to form the $r_1$ output signal. In step 8.2 the square root of the remainder is subtracted from the $r_1 + r_2$ term and the resulting remainder is multiplied by $\tfrac{1}{2}$ to form the $r_2$ output.

Having found the yaw monopulse ratios $r_1$ and $r_2$, the contemplated processing technique uses those ratios to solve for the pitch monopulse ratios $A_1$ and $A_2$. Thus, in steps 9.1 and 9.2 the $I_m (D_p S^*)$ term is multiplied, respectively, by $r_1$ and $r_2$. In steps 10.1 and 10.2 the resulting products are subtracted from the $I_m (\Delta S^*)$ term, and in steps 11.1 and 11.2 the resulting remainders are divided by the $I_m (D_y S^*)$ term to provide the pitch monopulse ratios $A_2$ and $A_1$ in accordance with Equations (29) and (28), respectively.

Having determined the pitch and yaw monopulse ratios for each of the targets or jammers within the beamwidth of the antenna 12 (FIG. 1), the actual pitch and yaw angular locations of the targets may be determined from Equations (1) and (2), respectively. Knowing the angular locations of the targets, guidance commands to intercept a selected one of the targets are developed in a conventional manner. As mentioned briefly hereinabove, such guidance commands are passed to the autopilot 24 (FIG. 1) wherein they are converted to control signals for the missile control surfaces (not shown).

What is claimed is:

1. The method of operating a four quadrant monopulse radar, where the signals received at each quadrant are represented by A, B, C and D, to resolve two sources of received signals when such sources are within the sum beam of such radar, such method comprising the steps of:
    (a) separately quadrature detecting signals received at each one of the four quadrants to produce eight video signals, associated pairs of such signals being representative of the real and imaginary parts of a corresponding one of the signals A, B, C and D;
    (b) forming the monopulse ratios $Y=[-(A+C)-(B+D)]/(A+B+C+D)$, $P = [(A+B)-(C+D)]/(A+B+C+D)$ and
$\Delta = [(A+D)-(B+C)]/(A+B+C+D)$ and the monopulse sums, $S = (A+B+C+D)$;

(c) forming the complex conjugates $Y^*$, $P^*$, $\Delta^*$ amd $S^*$; and (d) processing the monopulse ratios $Y$, $P$, $\Delta$ and $S$ along with the complex conjugate to solve the identity:

$$r_1/r_2 = \tfrac{1}{2}[(r_1 + r_2((r_1 \pm r_2)^2))^{\tfrac{1}{2}}]$$

where $r_1$ is the yaw monopulse ratio of one of the sources of signals received and $r_2$ is the yaw monopulse ratio of the second of the sources of signals received.

2. The method as in claim 1 with the additional step of processing the determined yaw monopulse ratios $r_1$, $r_2$ to determine the pitch ratios $a_1$, $a_2$ of the two sources of signals received.

* * * * *